US008301907B2

(12) United States Patent
Natu et al.

(10) Patent No.: US 8,301,907 B2
(45) Date of Patent: Oct. 30, 2012

(54) SUPPORTING ADVANCED RAS FEATURES IN A SECURED COMPUTING SYSTEM

(75) Inventors: Mahesh S. Natu, Portland, OR (US); Sham Datta, Hillsboro, OR (US); Jeff Wiedemeier, Austin, TX (US); James R. Vash, Littleton, MA (US); Sailesh Kottapalli, San Jose, CA (US); Scott P. Bobholz, Bolton, MA (US); Allen Baum, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1046 days.

(21) Appl. No.: 11/863,563

(22) Filed: Sep. 28, 2007

(65) Prior Publication Data

US 2009/0089566 A1    Apr. 2, 2009

(51) Int. Cl.
*G06F 11/30* (2006.01)

(52) U.S. Cl. .......................................... 713/189; 726/26
(58) Field of Classification Search .................. 713/189
See application file for complete search history.

(56) References Cited

U.S. PATENT DOCUMENTS

| 2002/0169976 | A1* | 11/2002 | Schelling et al. | 713/200 |
| 2003/0126442 | A1* | 7/2003 | Glew et al. | 713/170 |
| 2003/0226031 | A1* | 12/2003 | Proudler et al. | 713/200 |
| 2004/0103299 | A1* | 5/2004 | Zimmer et al. | 713/200 |

* cited by examiner

*Primary Examiner* — Shewaye Gelagay
(74) *Attorney, Agent, or Firm* — Jordan IP Law, PC

(57) ABSTRACT

Systems and methods for enabling Reliability, Availability & Serviceability features after launching a secure environment under the control of LaGrande Technology (LT), or comparable security technology, without compromising security are provided. In one embodiment, the method comprises adding at least one specific capability to a processor to enable at least one of CPU hot-plug, CPU migration, CPU hot removal and capacity on demand.

12 Claims, 2 Drawing Sheets

SUPPORTING ADVANCED RAS FEATURES IN A SECURED COMPUTING SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to computing environments and, more particularly, to systems and methods for supporting RAS features without compromising security in a secured computing environment.

BACKGROUND

Intel® Trusted Execution Technology for safer computing, code named LaGrande Technology (LT), is a versatile set of hardware extensions to Intel® processors and chipsets that enhances the digital office platform with security capabilities such as measured launch and protected execution. Intel Trusted Execution Technology provides hardware-based mechanisms that help protect against software-based attacks and protects the confidentiality and integrity of data stored or created on a personal computer (PC).

Better protection is achieved by enabling an environment where applications can run within their own space, protected from all other software on the system. These capabilities provide the protection mechanisms, rooted in hardware, that are necessary to provide trust in the application's execution environment and help protect vital data and processes from being compromised by malicious software running on a platform.

LT was first introduced in client platforms. LT-SX is an effort to extend LT protection to server platforms. LT-SX uses a security model that allows certain RAS (Reliability, Availability and Serviceability) features to co-exist with security by allowing some of the system firmware to be within the trust boundary. For example, the basic RAS features of memory sparing and memory mirroring may be enabled to co-exist with security by utilizing protected partitions, wherein applications can run in isolation, free from being observed or compromised by software running in standard partitions and other applications running in the protected partition.

Unfortunately, substantial challenges remain in enabling certain more-advanced RAS features that are conducive to maintaining a secured computing environment. For example, hot-plug and migration capabilities implemented in high-end server platforms for a central processing unit (CPU) may defy some of the requirements of an LT-based platform. That is, CPUs cannot presently be hot-plugged or migrated after launching a secure environment under the control of LT without compromising security.

New systems and methods are needed that can overcome the above shortcomings.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and methods for enabling RAS features in a secured computing environment without compromising security. Such features include, but are not limited to, hot-plugging or migrating a CPU after launching a secure environment under the control of security software (e.g., LT). CPU hot-plug refers to the physical addition of a CPU to a running system without shutting down the operating system (OS). CPU migration refers to redirecting a computing system component's attempt to access a failing CPU socket to a spare CPU.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for enabling an RAS feature in a secured environment by adding at least one specific capability to a CPU, CPU microcode, signed authenticated code module (ACM), system service processor (SSP) and/or BIOS is provided. The secured environment may be controlled by at least one of LaGrande Technology (LT) and comparable security technology, and the RAS feature may comprise CPU hot-plug, CPU migration, CPU hot removal and/or capacity on demand.

The specific capability may be differentiating between a CPU hot-plug event under the secured environment and a regular boot; preventing a system boot if a BIOS does not support Firmware Interface Table or does not contain a signed ACM; inspecting a BIOS to determine whether the BIOS can be trusted, and preventing BIOS code execution if the BIOS has been compromised; configuring a processor to match a state expected by the LT or comparable security technology; detecting whether a hot-plugged CPU supports LT capability (e.g., via a sideband interface), and/or allowing trusted code to modify an LT CPU agents list.

One or more of the above-disclosed embodiments in addition to certain alternatives are provided in further detail below with reference to the attached figures. The invention is not, however, limited to any particular embodiment disclosed.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
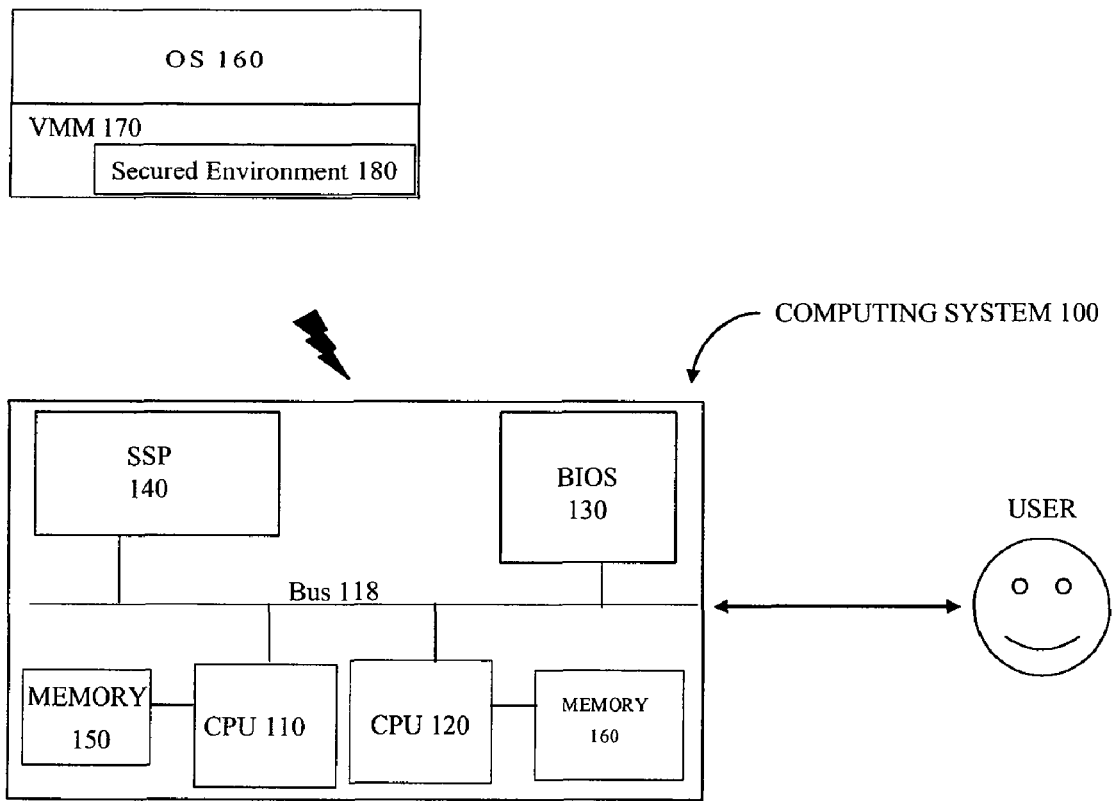
FIG. 1 illustrates an exemplary hardware and software environment in accordance with one or more embodiments.

Referring to FIG. 1, a computing system 100 may comprise a central processing unit (CPU) 110 that is coupled to a BIOS 130, system service processor (SSP) 140, memory 150 and possibly a hot-plugged CPU 120 by way of bus 118. Memory 160 may be hot plugged along with CPU 120. BIOS 130 is a logic code that is executed during computing system 100's startup that recognizes and controls various system components. SSP 140 comprises hardware and software components needed to monitor and control computing system 100's platform. In some embodiments, SSP 140 may operate independently from CPU 110 and VMM 170.

Memory 150 may comprise local memory, bulk storage, cache memory or any type of volatile or non-volatile type of storage medium suitable for storing data. CPUs 110, 120 are components of computing system 100 that are capable of executing program code (e.g., authenticated code modules (ACMs), microcode, application software, etc.). Bus 118 is a subsystem that transfers data or power between various components of computing system 100. VMM 170 controls and manages the hardware and software resources of computing system 100.

In accordance with one embodiment, a secured computing environment may be implemented by way of employing a virtual machine monitor (VMM) 170, configured to launch and maintain a secure environment 180. One or more operating systems (e.g., OS 160) can be running on top of VMM 170. VMM 170 may be configured to protect confidential information stored in computing system 100 by implementing secured environment 180, as provided in more detail below. In one embodiment, secure environment 180 may be supported by an Intel® trusted execution technology (e.g., LT).

It is noteworthy that, in the following, certain features and aspects of the invention are disclosed by way of example with reference to and as applicable in part to LT. It should be emphasized, however, that the scope of the invention should not be construed as limited to such exemplary embodiments or in particular to secure environments implemented exclusively under LT. As such, the principals, features and advantages provided herein may be implemented to work with or apply to any secured or trusted computing environments.

Figure 2:
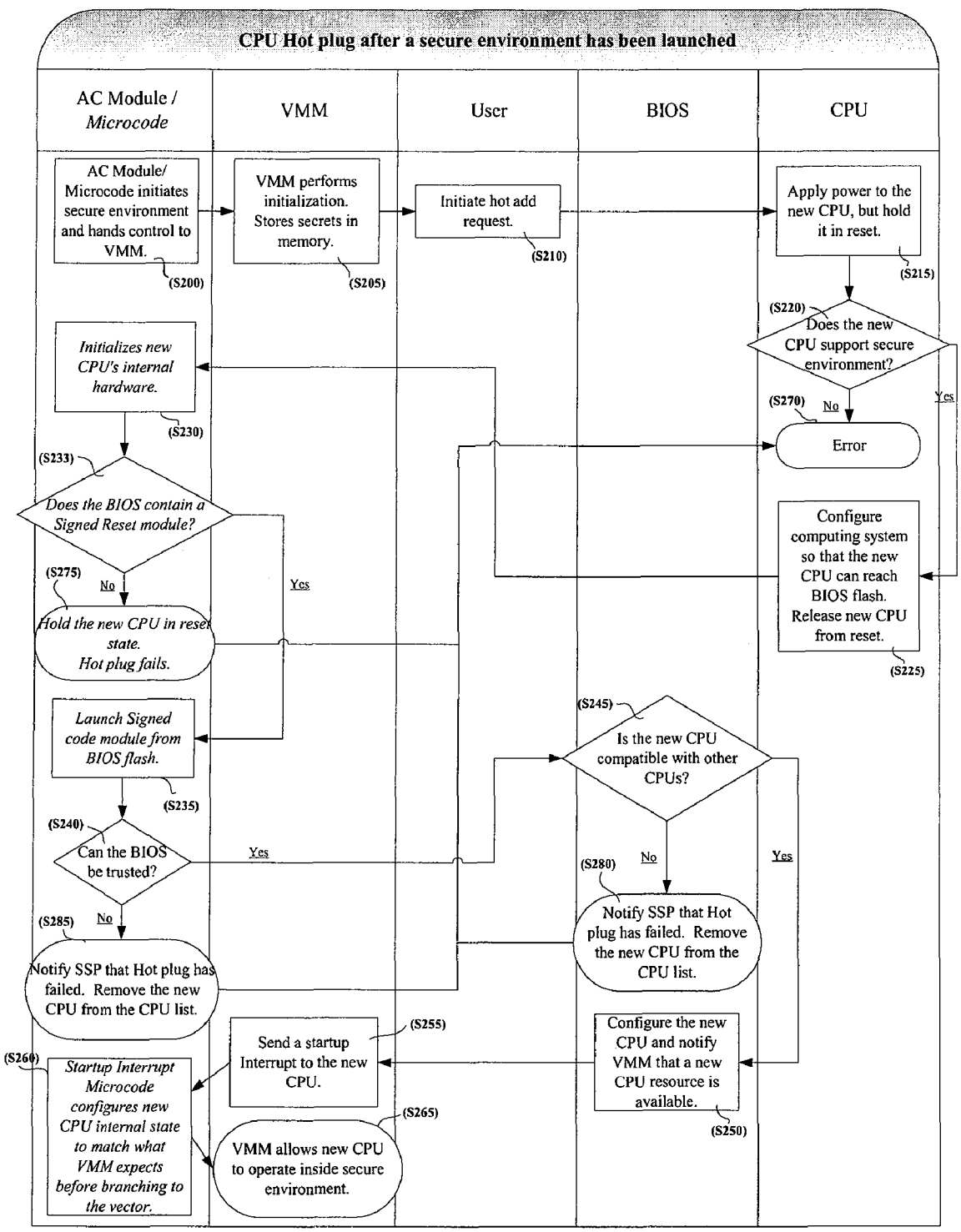
FIG. 2 is a flow diagram of a method for hot-plugging a CPU to a system according to an exemplary embodiment.

Referring to FIGS. 1 and 2, computing system 100, according to an exemplary embodiment, may be configured to support a CPU hot-plug (or CPU migration) process while maintaining a secure environment 180. To accomplish this, an ACM or a microcode may be executed by CPU 110 or CPU 120 to initiate a secure environment 180 and thereafter handover control to VMM 170 (S200). The ACM is desirably a signed module for enhancing system security, such that if the ACM's signature is not recognizable, CPU 110 may not execute the ACM and will not launch the secure environment.

Once secure environment 180 is initiated, VMM 170 performs initialization of the system 100 and stores confidential information (i.e., secrets) in memory 150 to protect said information from access by a miscreant by way of establishing a security mechanism supported by a secured environment 180 such as LT(S205). In addition, secrets stored by OS 160 may not be accessible to another operating system running on top of VMM 170 and vice versa.

A user may initiate a hot-plug request to add CPU 120 to computing system 100 by, for example, physically pressing a pushbutton (S210). In response, SSP 140 may apply power to CPU 120, but hold CPU 120 in reset mode (S215) until it can be determined that CPU 120 can be supported in secured environment 180. SSP 140 may determine whether CPU 120 supports secured environment 180 (S220). If so, SSP 140 configures computing system 100 such that CPU 120 can access BIOS 130, and SSP 140 releases CPU 120 from reset (S225). Otherwise, SSP 140 powers off CPU 120 and alerts the user that an error has occurred (S270).

In an embodiment where CPU 120 is released from reset, CPU 120 may execute a microcode to initialize CPU 120's internal hardware (S230) and determine whether BIOS 130 has a signed reset module (S233). If BIOS 130 does not have a signed reset module, then reset signal to CPU 120 may be reasserted and hot-plug process fulls (S275). Otherwise, CPU 120 launches a signed ACM from BIOS 130 (S235).

In one embodiment, the signed ACM analyzes BIOS 130 to determine whether BIOS 130 can be trusted (S240). If so, BIOS 130 proceeds to determine whether CPU 120 is compatible with other CPUs (e.g., CPU 110) in computing system 100 (S245). In some embodiments, a list of CPUs connected or added to computing system 100 secured environment 180 is maintained. Thus, if a hot-plug operation fulls, the list may be updated to remove a failed CPU from the list. Accordingly, if BIOS 130 cannot be trusted, then SSP 140 is notified that hot-plug operation has failed. SSP removes power to CPU 120. CPU 120 is removed from the secured environment 180's CPU list by BIOS 130.

On the other hand, if BIOS 130 determines that the CPUs in computing system 100 are compatible, BIOS 130 configures hot-plugged CPU 120 and notifies VMM 170 that a new CPU resource is available (S250) by for example adding CPU 120 to the secured environment 180's CPU list.

Once CPU 120 is added, VMM 170, in turn, may send a startup interrupt to CPU 120 (S255). A startup interrupt microcode may configure CPU 120's internal state to match what VMM 170 expects before branching to the VMM entry point (S260). The VMM entry point can match traditional target of startup interrupt or a special secure memory location. It is noteworthy that in certain embodiments, one or more operations initiated or performed by a microcode may be also performed by an ACM, or vice versa, depending on implementation.

Once CPU 120 is configured, VMM 170 allows the hot-plugged CPU 120 to operate within secure environment 180 (S265). Accordingly, CPU 120 may be hot-plugged to computing system 100 without jeopardizing secured environment 180. In this manner, computing system 100 may be protected against hackers that may, for example, try to flash a rogue BIOS and thereby gain control of the secrets stored in memory 150.

In some embodiments, computing system 100 may allow authorized updates to BIOS 130 before CPU 120 is hot-plugged. If a rogue BIOS is detected, computing system 100 prevents that BIOS 130 from running, and the hot-plug process preferably fulls gracefully to avoid disrupting the normal operation of computing system 100.

In accordance with some embodiments, certain capabilities may be added to CPU 110, hot-plugged CPU 120, BIOS 130, SSP 140 and other system components or software in system 100 to enable features that support CPU hot-plug and CPU migration. Such capabilities may be built on top of a code root of trust (e.g., a Firmware Interface Table (FIT)) comprising starting memory addresses and sizes for firmware components that are outside a protected boot block.

The FIT, in one embodiment, comprises a data structure that resides in BIOS flash. Using FIT, hardware or microcode can perform cryptographic measurement or verification of BIOS and thereby enable hardware based security capabilities. Hardware based security features are advantageous in that they are harder to defeat when compared with pure software based implementations. In one exemplary embodiment, a secured environment 180 is established by way of a FIT. That is, FIT is used as an information bridge between CPU 110 hardware and a code residing in memory 160 in order to establish the trustworthiness of the BIOS 130 from the hardware.

In some embodiments, said capabilities may comprise enhancement of CPU reset microcode, for example, such that the microcode differentiates between a CPU hot-plug event under a secure environment and a regular boot. In certain embodiments, a system boot may be prevented, for example, if a CPU 120 is hot-plugged under a secure environment 180 where BIOS 130 does not support FIT or does not include a signed ACM.

As noted earlier, a CPU reset microcode may launch a signed ACM to inspect BIOS 130 to determine whether BIOS 130 can be trusted or not. If BIOS 130 cannot be trusted, the signed ACM prevents execution of BIOS 130 code (e.g., holds CPU 120 in reset mode). An external agent (e.g., SSP 140) may detect whether CPU 120 supports the secured environment 180, for example, via a sideband interface. Sideband interface can be in the form of SMBUS and allows SSP 140 to determine the capabilities of the hot-plugged CPU 120.

While the RAS feature described in the above exemplary embodiments relates to a single core CPU hot-plug, those of ordinary skill in the art will recognize that the principals described above can be used to handle related RAS events including, but not limited to, hot-plugging of a multi-core CPU, simultaneous hot-plugging of a multi-core CPU and memory attached to its integrated memory controller, simultaneous hot-plugging of a multi-core CPU, memory attached to its integrated memory controller and IO Controllers, CPU migration, CPU hot removal, CPU hot-plugging or removal without physically adding or removing a CPU (e.g., CPU online/offline, wherein the CPU is already physically present in the system at all times, but is made available to VMM 170 at a later time) and capacity on demand (e.g., making one or more CPU cores available to a VMM on demand).

The invention can take the form of an entirely hardware embodiment, an entirely software embodiment or an embodiment comprising both hardware and software elements. In one embodiment, the invention may be implemented in software, which may comprise firmware, resident software, microcode, and ACMs, without limitation.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should also be understood that the logic code, programs, modules, processes, methods and the order in which the respective steps of each method disclosed here are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A computing system comprising:
   a first central processing unit (CPU);
   a BIOS;
   a system service processor (SSP), and
   memory for storing confidential information,
   wherein a virtual machine monitor (VMM) executed by the first CPU is configured to protect confidential information stored in memory by implementing a secured environment;
   wherein in response to initiation of a hot-plug process involving the physical addition of a second CPU to the computing system without requiring reboot, the SSP applies power to the second CPU, and holds the second CPU in a reset state until it is determined that the second CPU is supported in the secured environment;
   wherein in response to a determination by the SSP that the second CPU is supported in the secured environment, the SSP configures the computing system to allow the second CPU to access the BIOS;
   wherein in response to said access to the BIOS, the second CPU executes a trustworthiness determination to determine whether the BIOS can be trusted;
   further wherein in response to the determination that the second CPU is supported in the secured environment and a determination that the BIOS comprises a signed authenticated module (ACM), notifying the VMM that the second CPU is configured to match a state expected by the secured environment and the second CPU resource is available;
   in response to the notification the VMM sends a startup interrupt to the second CPU to configure the second CPU's internal state; and
   wherein in response to the configuration of the second CPU, the VMM allows the second CPU to operate within the secured environment.

2. The computing system of claim 1, wherein if the SSP determined that the second CPU is supported in secured environment, the SSP releases the second CPU from reset.

3. The computing system of claim 2, wherein in response to the second CPU being released from reset, the second CPU executes a microcode to initialize the second CPU's internal hardware and determine whether the BIOS has a signed reset module.

4. The computing system of claim 3, wherein in response to the BIOS not having a signed reset module, the SSP reasserts reset signal to the second CPU or powers it off 5. The computing system of claim 3, wherein in response to the BIOS having a signed reset module, the second CPU launches a signed code module (ACM).

6. The computing system of claim 5, wherein the signed ACM analyzes the BIOS to determine whether the BIOS can be trusted.

7. The computing system of claim 6, wherein in response to determining that the BIOS can be trusted, the BIOS determines whether the second CPU is compatible with the first CPU.

8. The computing system of claim 7, wherein in response to determining that the first CPU is compatible with the second CPU, the BIOS configures the second CPU and notifies the VMM that the second CPU is available.

9. The computing system of claim 8, wherein the BIOS adds a reference to the second CPU to the secured environment's CPU list and notifies the VMM.

10. The computing system of claim 1, wherein the secured environment is supported by a trusted execution technology.

11. The computing system of claim 1, wherein the secured environment is established by way of implementing a firmware interface table (FIT) to examine the trustworthiness of the BIOS.

12. A method of enabling a reliability, availability and serviceability (RAS) feature in computing system supporting a secured environment, the computing system comprising a first CPU, a system service processor (SSP), a signed authenticated code module (ACM) and a BIOS, the method comprising:

differentiating between a CPU hot-plug event under the secured environment and a regular boot, in response to detecting a second CPU hot-plugged to the system, wherein the hot-plug event includes the physical addition of the second CPU to the computing system without requiring reboot;

storing confidential information, wherein a virtual machine monitor (VMM) executed by the first CPU is configured to protect confidential information stored in memory by implementing a secured environment that includes a trustworthiness determination with respect to the BIOS;

in response to initiation of the hot-plug event involving the addition of the second CPU, the SSP applies power to the second CPU and holds the second CPU in a reset state until it is determined that the second CPU is supported in the secured environment;

preventing a system boot if the BIOS does not comprise the ACM;

determining that the second CPU is supported in the secured environment;

in response to a determination by the SSP that the second CPU is supported in the secured environment, configuring by the SSP the computing system to allow the second CPU to access the BIOS and release the second CPU from reset state;

using the second CPU to launch the ACM, wherein the ACM inspects the BIOS to determine whether the BIOS can be trusted;

preventing the BIOS from execution if the BIOS has been compromised, and configuring the second CPU to match a state expected by the secured environment;

in response to the determination that the second CPU is supported in the secured environment and a determination that the BIOS comprises a signed authenticated module (ACM), notifying the VMM that the second CPU is configured to match a state expected by the secured environment and the second CPU resource is available;

in response to the notification, the VMM sending a startup interrupt to the second CPU to configure the second CPU's internal state; and in response to the configuration of the second CPU, the VMM allowing the second CPU to operate within the secured environment.

* * * * *